United States Patent
Cheng et al.

(10) Patent No.: US 11,025,531 B2
(45) Date of Patent: Jun. 1, 2021

(54) PACKET TRANSMISSION METHOD AND HYBRID ACCESS GATEWAY

(71) Applicant: Huawei Technologies Co., Ltd., Shenzhen (CN)

(72) Inventors: Jian Cheng, Nanjing (CN); Xia Zhu, Nanjing (CN); Naiqiang Qiao, Nanjing (CN); Liangyu Song, Beijing (CN); Hongzhang Shang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 16/447,607

(22) Filed: Jun. 20, 2019

(65) Prior Publication Data

US 2019/0306052 A1 Oct. 3, 2019

Related U.S. Application Data

(63) Continuation of application No. PCT/CN2017/105884, filed on Oct. 12, 2017.

(30) Foreign Application Priority Data

Dec. 21, 2016 (CN) .......................... 201611190799.0

(51) Int. Cl.
*H04L 12/707* (2013.01)
*H04L 12/66* (2006.01)
(Continued)

(52) U.S. Cl.
CPC .............. *H04L 45/24* (2013.01); *H04L 12/66* (2013.01); *H04L 43/0852* (2013.01); *H04L 45/123* (2013.01); *H04L 47/122* (2013.01)

(58) Field of Classification Search
CPC ..... H04L 45/24; H04L 12/66; H04L 43/0852; H04L 45/123; H04L 47/122; H04L 47/125; H04L 47/12; H04L 47/127
See application file for complete search history.

(56) References Cited

U.S. PATENT DOCUMENTS

| 2012/0250635 | A1 | 10/2012 | Gao |
| 2014/0071817 | A1 | 3/2014 | Chen |

(Continued)

FOREIGN PATENT DOCUMENTS

| CN | 101039277 A | 9/2007 |
| CN | 102217257 A | 10/2011 |

(Continued)

OTHER PUBLICATIONS

Leymann et al.,"Traffic Distribution for GRE Tunnel Bonding", Mar. 21, 2016, pp. 3-6.*
Leymann, N., "GRE Tunnel Bonding," XP015107539, draft-zhang-gre-tunnel-bonding-00.txt, Jul. 6, 2015, pp. 1-39.
Cullen, M., et al, "Problem Statement: Bandwidth Aggregation for Internet Access," XP015116522, draft-zhang-banana-problem-statement-03.txt, Oct. 31, 2016, pp. 1-17.
(Continued)

*Primary Examiner* — Jackie Zuniga Abad
(74) *Attorney, Agent, or Firm* — Conley Rose, P.C.

(57) ABSTRACT

A hybrid access gateway receives packets that are sent by a network side device and are destined for a home gateway. When detecting that congestion occurs on a first transmission link and that no congestion occurs on a second transmission link, the hybrid access gateway obtains a first committed information rate (CIR) of the first transmission link and a second CIR of the second transmission link, classifies the packets into a first-type packet and a second-type packet, and transmits the first-type packet using the first transmission link and the second-type packet using the second transmission link. By properly allocating packets transmitted on the second transmission link, the hybrid access gateway can control one-way delays of the first transmission link and the second transmission link, thereby avoiding a packet loss caused by a sequencing buffer overflow.

22 Claims, 7 Drawing Sheets

(51) Int. Cl.
*H04L 12/26* (2006.01)
*H04L 12/721* (2013.01)
*H04L 12/803* (2013.01)

(56) References Cited

U.S. PATENT DOCUMENTS

2016/0380884 A1* 12/2016 Sarikaya ................ H04W 8/08
                                                    370/389
2017/0150401 A1   5/2017  Guo et al.

FOREIGN PATENT DOCUMENTS

| CN | 102332950 A | 1/2012 |
| CN | 104158761 A | 11/2014 |
| EP | 3166267 A1 | 5/2017 |
| WO | 2016019822 A1 | 2/2016 |

OTHER PUBLICATIONS

Foreign Communication From a Counterpart Application, Chinese Application No. 17884463.5, dated Oct. 31, 2019, 10 pages.
Machine Translation and Abstract of Chinese Publication No. CN101039277, Sep. 19, 2007, 8 pages.
Machine Translation and Abstract of Chinese Publication No. CN102332950, Jan. 25, 2012, 9 pages.
Foreign Communication From a Counterpart Application, PCT Application No. PCT/CN2017/105884, English Translation of International Search Report dated Dec. 28, 2017, 2 pages.
Foreign Communication From a Counterpart Application, PCT Application No. PCT/CN2017/105884, English Translation of Written Opinion dated Dec. 28, 2017, 5 pages.

* cited by examiner

PACKET TRANSMISSION METHOD AND HYBRID ACCESS GATEWAY

CROSS-REFERENCE TO RELATED APPLICATIONS

This application is a continuation of International Patent Application No. PCT/CN2017/105884 filed on Oct. 12, 2017, which claims priority to Chinese Patent Application No. 201611190799.0 filed on Dec. 21, 2016. The disclosures of the aforementioned applications are hereby incorporated by reference in their entireties.

TECHNICAL FIELD

Embodiments of the present disclosure relate to the field of communications technologies, and in particular, to a packet transmission method and a hybrid access gateway.

BACKGROUND

With the continuous popularization of networks, an overwhelming majority of home network users access the Internet currently using a fixed bandwidth network provided by an operator. In an early stage, the home network users generally access the Internet using a digital subscriber line (DSL) access technology, and connect a terminal to the Internet using a copper wire. Because an optical fiber can provide higher access bandwidth, many operators gradually substitute the optical fiber for the copper wire to connect a terminal to the Internet. However, the operators have invested a large sum of money in deployment of the DSL access technology, and therefore many of the operators still use the DSL access technology in remote areas, so as to reduce operating costs.

However, with the development of various Internet services, especially the continuous growth of video services, the DSL access technology has become a bandwidth bottleneck. Theoretically, an asymmetric digital subscriber line (ADSL) can provide a maximum downlink rate of 8 Mbps for a user, and a very high speed digital subscriber line (VDSL) can provide a maximum downlink rate of 55 Mbps. However, in practice, the VDSL is further affected by a length of a copper wire and interference from an external signal. Actually, it is highly difficult for the VDSL to reach the downlink rate of 55 Mbps, and a typical downlink rate is approximately 20 Mbps.

Therefore, to break the bandwidth bottleneck caused by the DSL access technology, as shown in FIG. 1, the DSL access technology and a Long Term Evolution (LTE) access technology are bonded in the other approaches, so that a user uses a terminal to access the Internet using DSL and LTE, to break a bandwidth bottleneck in using only DSL to access the Internet. However, even though the DSL access technology and the LTE access technology are bonded to access the Internet, bandwidth higher than that provided using only the DSL access technology to access the Internet cannot be provided.

SUMMARY

To overcome a problem in the prior art that when a user accesses the Internet by bonding a DSL access technology and an LTE access technology, bandwidth higher than that provided using only the DSL access technology to access the Internet cannot be provided, the present disclosure provides a packet transmission method and a hybrid access gateway.

According to a first aspect of embodiments of the present disclosure, a packet transmission method is provided, including receiving, by a hybrid access gateway, packets that are sent by a network side device and destined for a home gateway, where the home gateway communicates with the hybrid access gateway using a first transmission link and a second transmission link separately; when detecting that congestion occurs on the first transmission link and that no congestion occurs on the second transmission link, obtaining, by the hybrid access gateway, a first committed information rate CIR of the first transmission link and a second CIR of the second transmission link, where the first CIR is a first preset transmission rate of data transmission supported by the first transmission link, and the second CIR is a second preset transmission rate of data transmission supported by the second transmission link; and classifying, by the hybrid access gateway, the packets into a first-type packet and a second-type packet based on the first CIR and the second CIR, and transmitting the first-type packet using the first transmission link and the second-type packet using the second transmission link.

In a possible design, m bits of packets are received by the hybrid access gateway in a unit time; and the classifying, by the hybrid access gateway, the packets into a first-type packet and a second-type packet based on the first CIR and the second CIR includes determining, by the hybrid access gateway based on the first CIR, that a maximum of p bits of packets are allowed to pass through the first transmission link in the unit time; determining, by the hybrid access gateway based on the second CIR, that a maximum of q bits of packets are allowed to pass through the second transmission link in the unit time; first using, by the hybrid access gateway, p bits in the packets as the first-type packet; and further, if m−p≤q, using, by the hybrid access gateway, m−p bits in the packets as the second-type packet; or if m−p>q, using, by the hybrid access gateway, q bits in the packets as the second-type packet, and m−p−q bits in the packets as the first-type packet.

In a possible design, the method further includes obtaining, by the hybrid access gateway, a first delay and a first packet loss rate of the first transmission link; and when determining that the first delay is greater than a first threshold and/or that the first packet loss rate is greater than a second threshold, determining, by the hybrid access gateway, that congestion occurs on the first transmission link.

In a possible design, the method further includes sending, by the hybrid access gateway, a measurement packet to the second transmission link, to obtain a measurement result, where the measurement result includes a second delay of the second transmission link; and when determining that the second delay is less than the second threshold and/or that an absolute value of a difference between the second delay and the first delay is less than a third threshold, determining, by the hybrid access gateway, that no congestion occurs on the second transmission link.

In a possible design, the obtaining a first CIR of the first transmission link includes obtaining, by the hybrid access gateway, maximum transmission bandwidth of the first transmission link; and using, by the hybrid access gateway, a product of the maximum transmission bandwidth and a preset coefficient as the first CIR.

In a possible design, the obtaining a second CIR of the second transmission link includes: A. setting, by the hybrid access gateway, the second CIR to a first value; B. determining, by the hybrid access gateway, whether congestion occurs on the second transmission link; and performing step C when determining that no congestion occurs on the second transmission link, or performing step D when determining that congestion occurs on the second transmission link; and C. increasing the first value in a first preset manner, to obtain an updated value of the second CIR, and performing the steps B and C based on the updated value, until the hybrid access gateway determines a target value when no congestion occurs on the second transmission link, and uses the target value as the second CIR, where the target value is equal to maximum available transmission bandwidth of the second transmission link, or the target value is less than a maximum available transmission bandwidth preset value of the second transmission link; or D. reducing the first value in a second preset manner, to obtain an updated value of the second CIR, and performing the steps B and D based on the updated value, until the hybrid access gateway determines a target value when no congestion occurs on the second transmission link, and uses the target value as the second CIR, where the target value is equal to maximum available transmission bandwidth of the second transmission link, or the target value is less than a maximum available transmission bandwidth preset value of the second transmission link.

In a possible design, the method further includes when detecting that the absolute value of the difference between the second delay and the first delay is greater than the third threshold or that the second delay is greater than the second threshold, reducing, by the hybrid access gateway, the second CIR in the second preset manner; or when detecting that timing duration of a timer of the second CIR is greater than preset duration and that the second delay is less than the second threshold, increasing, by the hybrid access gateway, the second CIR in the first preset manner.

In a possible design, the method further includes when detecting that a background packet is transmitted on the second transmission link, reducing, by the hybrid access gateway, the second CIR in the second preset manner; or when detecting that background packets transmitted on the second transmission link are reduced, increasing, by the hybrid access gateway, the second CIR in the first preset manner, where a packet that does not enter the second transmission link through the hybrid access gateway is considered as the background packet.

According to a second aspect of embodiments of the present disclosure, a hybrid access gateway is provided, including a receiving unit configured to receive packets that are sent by a network side device and destined for a home gateway, where the home gateway communicates with the hybrid access gateway using a first transmission link and a second transmission link separately; and a processing unit configured to when detecting that congestion occurs on the first transmission link and that no congestion occurs on the second transmission link, obtain a first committed information rate CIR of the first transmission link and a second CIR of the second transmission link, where the first CIR is a first preset transmission rate of data transmission supported by the first transmission link, and the second CIR is a second preset transmission rate of data transmission supported by the second transmission link, where the processing unit is further configured to classify the packets into a first-type packet and a second-type packet based on the first CIR and the second CIR, and transmit the first-type packet using the first transmission link and the second-type packet using the second transmission link.

The hybrid access gateway is further configured to implement the foregoing packet transmission method provided in any one of the possible implementations of the first aspect.

The technical solutions provided in the embodiments of the present disclosure may include the following beneficial effects.

According to the packet transmission method and the hybrid access gateway provided in the embodiments of the present disclosure, the hybrid access gateway receives the packets that are sent by the network side device and destined for the home gateway; when detecting that congestion occurs on the first transmission link and that no congestion occurs on the second transmission link, the hybrid access gateway obtains the first CIR of the first transmission link and the second CIR of the second transmission link; and the hybrid access gateway classifies the packets into the first-type packet and the second-type packet, and transmits the first-type packet using the first transmission link and the second-type packet using the second transmission link. This can ensure that when congestion occurs on the first transmission link but no congestion occurs on the second transmission link, the first transmission link and the second transmission link are connected to the hybrid access gateway in a hybrid access manner. By properly allocating packets transmitted on the second transmission link, the hybrid access gateway can control one-way delays of the first transmission link and the second transmission link, thereby avoiding a packet loss caused by a sequencing buffer overflow, and greatly improving transmission efficiency of link transmission.

It should be understood that the foregoing general description and the following detailed description are merely exemplary and illustrative, and should not limit the present disclosure.

BRIEF DESCRIPTION OF DRAWINGS

Accompanying drawings herein included in the specification and constituting a part of the specification illustrate embodiments in accordance with the present disclosure, and together with the specification, are used for explaining principles of the present disclosure.

DESCRIPTION OF EMBODIMENTS

The following describes embodiments of the present disclosure with reference to accompanying drawings.

Figure 1:
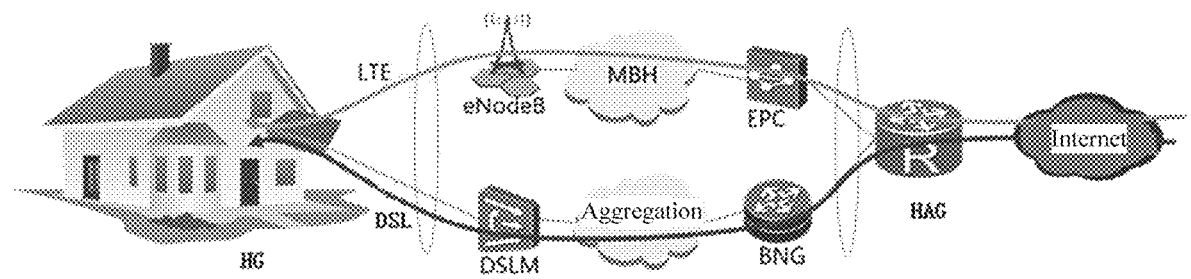
FIG. 1 is a schematic diagram of a hybrid access scenario according to an embodiment of the present disclosure.

In the other approaches, to break a bandwidth bottleneck caused by a DSL access technology, the DSL access technology and an LTE access technology are bonded, so that a user uses a terminal to access the Internet using DSL and LTE, to break a bandwidth bottleneck in using only DSL to access the Internet. As shown in FIG. 1, a home gateway (HG) accesses the Internet using both a DSL link and an LTE link. When packets from a network side (Internet) enter a hybrid access gateway (HAG), the HAG may send the packets from the network side to the HG separately in a per-flow or per-packet load sharing manner using the DSL link and LTE link.

Per-flow load sharing is a relatively common manner, in which the HAG allocates different flows to different downlinks based on a 5-tuple (a source IP address, a source port number, a destination IP address, a destination port number, and a transport layer protocol) of a packet and a hash algorithm. Such a manner is relatively simple to implement. However, the per-flow manner has a distinct weakness, that is, each flow is limited by bandwidth of a link of the flow. For example, maximum bandwidth of the DSL link is 30 Mbps, and maximum bandwidth of the LTE link is 20 Mbps. In the per-flow manner, a maximum transmission rate of a flow allocated to the DSL link can only be 30 Mbps, and a maximum transmission rate of a flow allocated to the LTE link can only be 20 Mbps. There is no such limitation if the per-packet manner is used, and theoretically a maximum transmission rate can reach 50 Mbps.

In per-packet load sharing, the HAG encapsulates each packet using the Generic Routing Encapsulation (GRE) protocol, and sends the packet to the HG using the DSL link or the LTE link. When a packet rate on the DSL link exceeds a threshold of the DSL link, the HAG sends a packet whose rate exceeds the threshold to the HG using the LTE link. The threshold of the DSL link may be dynamically changed with service bandwidth. When encapsulating the packet, the HAG adds a sequence number to a GRE header of each encapsulated packet. After receiving the GRE-encapsulated packet, the HG uses the sequence number in the GRE header of the packet to resolve out-of-order delivery caused by the per-packet load sharing. To prevent a packet from being discarded, an in-order delivery delay is set for in-order delivery, and the packet is directly sent after a timeout.

However, a condition of an actual network is usually not ideal, and this is a common case in actual measurement that after the DSL link and the LTE link are bonded, a Transmission Control Protocol (TCP) throughput rate is less than bandwidth of the single DSL link or LTE link, that is, 1+1<1. For example, the bandwidth of the DSL link is 30 Mbps, and the bandwidth of the LTE link is 20 Mbps, but after the DSL link and the LTE link are bonded, the TCP throughput rate can only reach 15 Mbps.

In the embodiments of the present disclosure, bonding of the DSL link and the LTE link is referred to as hybrid access (HA), and a logical link formed by the DSL link and the LTE link is referred to as an HA link. A reason for which the HA causes a delay is as follows: A priority of a packet sent to the LTE link in an HA scenario (referred to as an HA packet below) is lower than a priority of a normal LTE packet, while a relatively large queuing buffer is usually set on a wireless device; therefore, the HA packet on the wireless device is not scheduled for a long time and waits in a queue, which causes a relatively large delay of the HA packet on the LTE link. Moreover, when packets on the LTE link outnumber packets in the queuing buffer of the wireless device, the wireless device first discards the HA packet.

In addition, a phenomenon of erroneously determining out-of-order delivery exists in the other approaches. To be specific, if a difference between delays of the two links (such as the DSL link and LTE link) is excessively large, a sequencing buffer of the HG cannot process packets and directly sends the packets to a TCP protocol stack, which causes the TCP to erroneously determine the out-of-order delivery as a packet loss.

To verify the foregoing problems existing in the other approach, the present disclosure provides theoretical analysis in the following embodiment.

Figure 2:
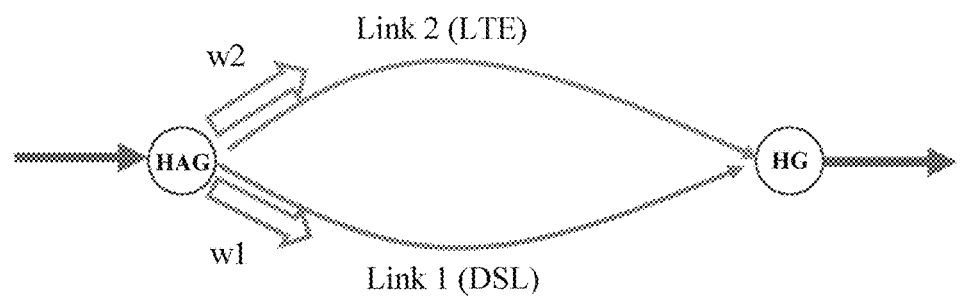
FIG. 2 is a schematic diagram of hybrid access according to an embodiment of the present disclosure.

In a scenario shown in FIG. 2, a main reason for the foregoing performance problems is that because of a very poor network condition of the LTE link, a throughput rate of the HA link after the hybrid access is enabled is less than a throughput rate of the DSL link.

A theoretical formula of a TCP throughput rate is shown in formula (1):

$$\text{TCP Throughput} \leq \min\left(BW, \frac{WindowSize}{RTT}, \frac{MSS \times C}{RTT \times \sqrt{p}}\right) \quad (1)$$

where TCP Throughput represents the TCP throughput rate, BW represents bandwidth, WindowSize represents a size of a sending window, RTT represents a round-trip time, MSS represents a size of a payload of each TCP packet, C represents a constant, whose value is usually 1 or 1.22, and p represents a packet loss rate.

It can be learned from formula (1) that the TCP throughput rate is inversely proportional to the delay and the packet loss rate.

After the HA is enabled, an overall delay of the HA link is a larger value between delays of the two links, and an overall packet loss rate depends on weights of the links, as shown in formula (2):

$$RTT_{HA} = \max(RTT_1, RTT_2) p_{HA} = w_1 \times p_1 + w_2 \times p_2 \quad (2)$$

where $RTT_{HA}$ represents the delay of the HA link, $RTT_1$ represents a delay of the DSL link, $RTT_2$ represents a delay of the LTE link, $w_1$ represents a weight of the DSL link, $w_2$ represents a weight of the LTE link, $p_1$ represents a packet loss rate of the DSL link, and $p_2$ represents a packet loss rate of the LTE link.

Therefore, an overall throughput rate of the HA link can be expressed using formula (3):

$$T_{HA} \le \min\left(BW_1 + BW_2, \frac{WindowSize}{\max(RTT_1, RTT_2)}, \frac{MSS \times C}{\max(RTT_1, RTT_2) \times \sqrt{w_1 \times p_1 + w_2 \times p_2}}\right) \quad (3)$$

where $BW_1$ represents bandwidth of the DSL link, $BW_2$ represents bandwidth of the LTE link, WindowSize represents a size of a sending window, MSS represents a size of a payload of each TCP packet, C represents a constant, whose value is usually 1 or 1.22, $RTT_1$ represents a delay of the DSL link, $RTT_2$ represents a delay of the LTE link, $p_1$ represents a packet loss rate of the DSL link, and $p_2$ represents a packet loss rate of the LTE link.

A key part in the formula that affects the throughput rate most is:

$$\frac{MSS \times C}{\max(RTT_1, RTT_2) \times \sqrt{w_1 \times p_1 + w_2 \times p_2}}$$

If a network condition of a link 2 is excessively poor and there is $\max(RTT_1, RTT_2) \times \sqrt{w_1 \times p_1 + w_2 \times p_2} > RTT_1 \times \sqrt{p_1}$, the throughput rate of the HA link is even less than the throughput rate of the DSL link. Therefore, the foregoing problems in the other approaches mainly depend on severity of the link 2 (the LTE link). If $RTT_2 > RTT_1$ and $p_2 > p_1$, the foregoing problems in the other approaches definitely exist.

Therefore, to resolve the foregoing problems in the other approaches, the embodiments of the present disclosure provide a packet transmission method and a hybrid access gateway.

Figure 3A:
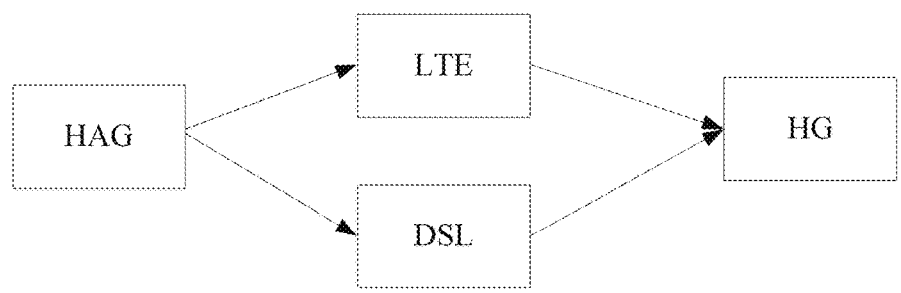
FIG. 3A is a schematic diagram of hybrid access according to an embodiment of the present disclosure.

FIG. 3A is a schematic diagram of hybrid access according to an embodiment of the present disclosure.

Figure 4:
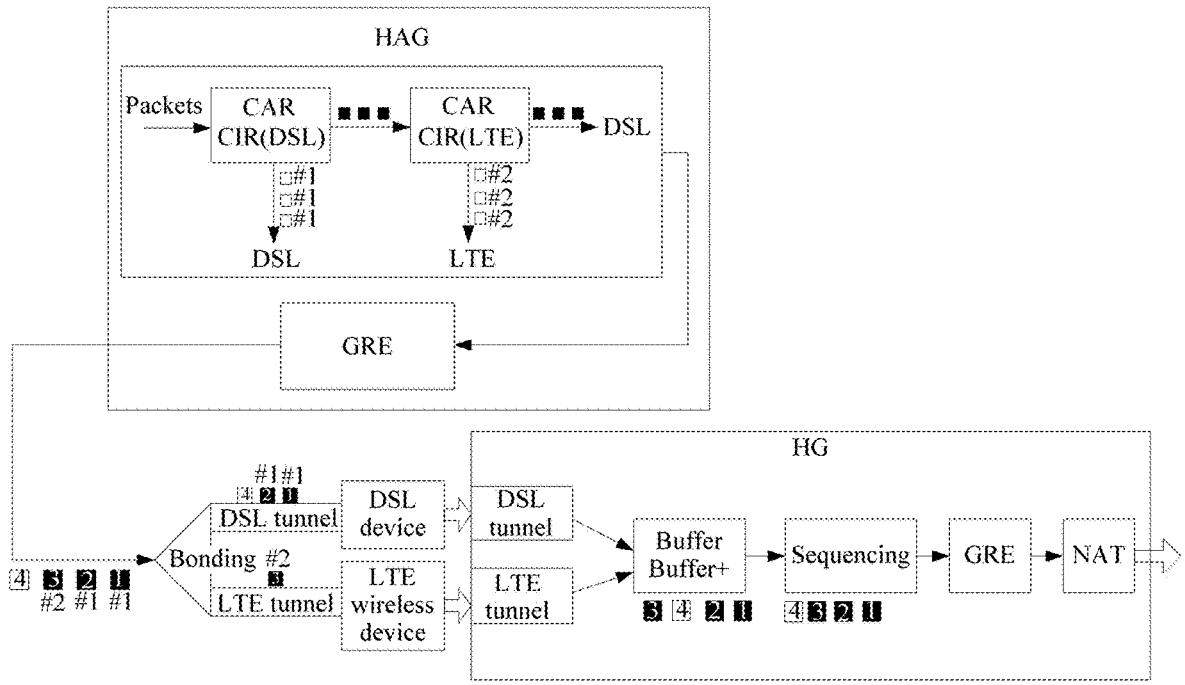
FIG. 4 is a schematic diagram of packet transmission according to an embodiment of the present disclosure.

In addition, as shown in FIG. 4, a committed access rate (CAR) is set in a HAG in this embodiment of the present disclosure. The CAR is used to classify inbound and outbound traffic on a port or a sub-port based on a preset rate, into two types: a packet whose rate exceeds a specific rate and a packet whose rate does not exceed a specific rate, and then the packets may be colored (Actually, TOS fields of IP packets are stamped with different markers, and different processing may be subsequently performed for the packets with the different markers. It is usually agreed that, a packet whose rate exceeds the preset rate is a yellow packet, and a packet whose rate is less than the preset rate is a green packet). In this embodiment of the present disclosure, the CAR refers to a particular classification module. A committed information rate (CIR) is a rate that is set in the CAR. A packet whose rate is greater than or equal to the rate is a yellow packet, and a packet whose rate is less than the rate is a green packet.

It should be noted that, to help readers distinguish between the yellow packet and the green packet in FIG. 4 that are classified by the CAR classification module, in this embodiment of the present disclosure, in FIG. 4, a black box is used to represent a yellow packet, and a white box is used to represent a green packet.

In this embodiment of the present disclosure, two-stage CAR classification is performed, and packets obtained after the two-stage CAR classification are transmitted using a DSL link or an LTE link.

With reference to FIG. 1 to FIG. 4, if a convergence ratio is not considered, access bandwidth of a home broadband network may be considered as exclusive to a user, while access bandwidth of a wireless network is shared by a plurality of users. This directly determines different charge modes of the home broadband network and the wireless network: The home broadband network is usually charged monthly, with no limit of traffic, while the wireless network is usually charged based on traffic. In short, the home broadband network is a relatively cheap network, while the wireless network is a relatively expensive network. Therefore, a link selection policy for a packet in this embodiment of the present disclosure is to preferentially select the DSL link. An LTE network is used as an example of the wireless network for description in this embodiment of the present disclosure, and this embodiment of the present disclosure is not limited thereto.

Figure 3B:
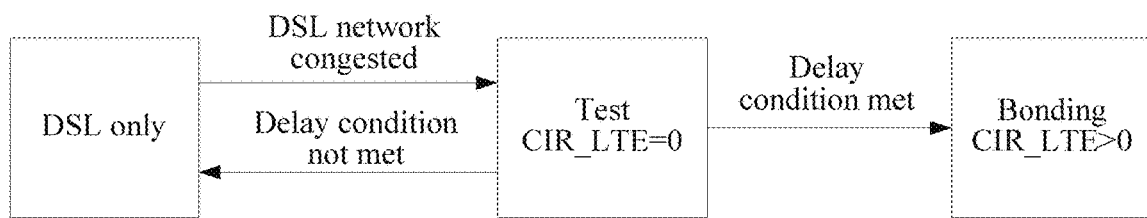
FIG. 3B is a schematic diagram of hybrid access status determining according to an embodiment of the present disclosure.

In the packet transmission method provided in this embodiment of the present disclosure, with reference to FIG. 3B, in an initial state of network transmission, only the DSL link is used for data transmission, and the LTE link is completely disabled. In other words, in the initial state, the HAG uses only the DSL link to send and receive data, without using the LTE link for data transmission, including not using the LTE link for measurement packet transmission. The HAG obtains parameters such as a delay and a packet loss rate on the DSL link, to determine whether congestion occurs on the DSL link. When the HAG detects that congestion occurs on the DSL link, it indicates that an actual requirement cannot be met if the HAG uses only the DSL link for packet transmission. In this case, it needs to be considered to use hybrid access of the DSL link and the LTE link for packet transmission. Therefore, the HAG switches to a test state. In this case, LTE_CIR shown in FIG. 3B is equal to 0, and only a measurement packet is sent on the LTE link, to measure parameters such as a delay and a packet loss rate of the LTE link. Determining is performed based on the parameters obtained through measurement. If a round-trip time (RTT) of the LTE link is greater than queuing buffer duration of a wireless device, or Delay (LTE)−Delay(DSL) >HG sequencing buffer time, it may be determined that the LTE link is already in a congested state, and a condition for using an HA link cannot be met. In this case, the HAG rolls back to the state of using only the DSL link for packet transmission. In addition, a timer may further be set in this embodiment of the present disclosure, and the HA does not enter the test state before the timer reaches preset duration.

Delay(LTE) represents the delay of the LTE link, and Delay(DSL) represents the delay of the DSL link. A difference between the delay of the LTE link and the delay of the DSL link cannot exceed the sequencing buffer time on the HG; otherwise a sequencing timeout occurs on the HG and causes out-of-order delivery. In addition, the round-trip time of the LTE link cannot be greater than the queuing buffer time (usually at least 300 milliseconds) of the wireless device; otherwise a packet loss occurs on the LTE link in a high-delay case.

When obtaining the round-trip time of the DSL link or the LTE link, the HAG periodically sends a measurement packet to the LTE link or the DSL link, and records, in the packet, time t1 at which the measurement packet is sent. After receiving the measurement packet, the HG immediately sends the packet back to the HAG. Time at which the HAG receives the measurement packet is t2, and t2−t1 is the round-trip time of the LTE link or the DSL link.

In addition, when a network link is lightly loaded, an RTT is usually a relatively small inherent value (minimum delay), and a packet loss rate is also relatively small (minimum packet loss rate). As a throughput rate continuously increases, a processing capacity of a network device becomes limited, and packets start to queue in the device, resulting in network congestion. Consequently, the RTT continuously increases, the packet loss rate also starts to increase, but the throughput rate decreases instead. Therefore, in this embodiment of the present disclosure, whether congestion occurs on a network is determined by measuring changes in a delay and a packet loss rate of the network, and a maximum throughput rate that can be reached before congestion occurs is considered as a maximum capability of the link. In other words, the maximum throughput rate exactly corresponds to maximum network utilization.

If the LTE link meets the delay condition, that is, the RTT of the LTE link is less than the queuing buffer duration of the wireless device, and Delay(LTE)−Delay(DSL)<HG sequencing buffer duration, the HAG enters a bonding state, and enables the HA. With reference to FIG. 4, based on the two-stage CAR classification, the packets that need to be transmitted are allocated to the DSL link or the LTE link for transmission. An initial value of CIR_DSL is a product of a coefficient (such as 0.95) and a maximum transmission rate that can be reached by the DSL link. This can ensure that CIR_DSL can basically cover DSL link bandwidth, without exceeding the DSL link bandwidth. The bonding state may be considered as a state that the HAG needs to enter the HA.

That is, CIR_DSL=THROUGHPUT_DSL_MAX*0.95, where THROUGHPUT_DSL_MAX represents the maximum transmission rate that can be reached by the DSL link.

In addition, an initial value of CIR_LTE is a relatively small value CIR_LTE_MIN, and may be usually set to 10 KB. Because the LTE link is shared by a plurality of users, an upper limit of LTE bandwidth cannot be determined, and CIR_LTE needs to be calculated for adaptation of actual bandwidth of the LTE link.

Figure 5:
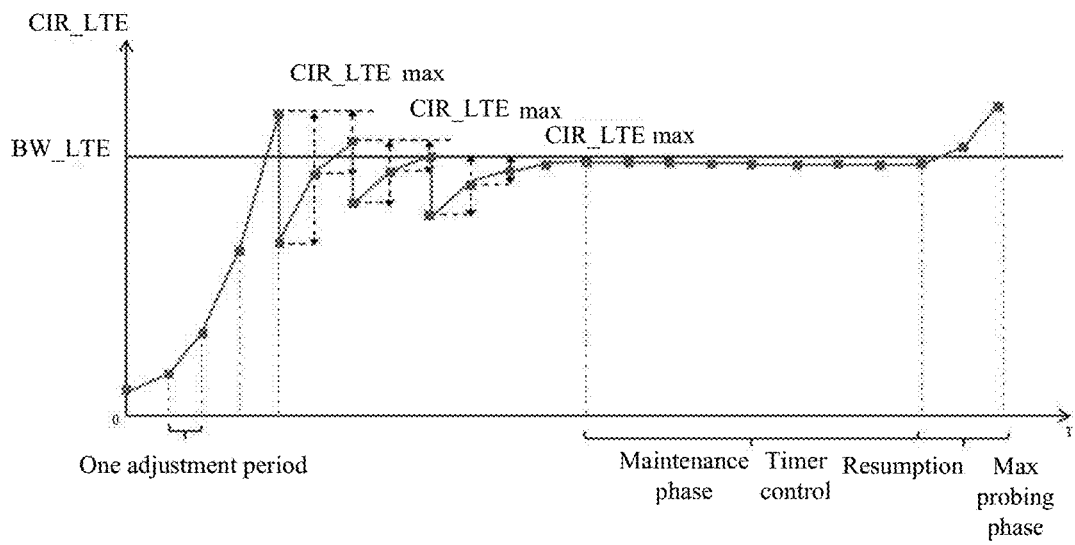
FIG. 5 is a schematic diagram of CIR_LTE adjustment during hybrid access.

As shown in FIG. 5, a vertical axis represents CIR_LTE, a horizontal axis represents time, and BW_LTE represents actual bandwidth of the LTE link. Because the LTE link is shared by a plurality of users, and the actual bandwidth BW_LTE of the LTE link may be different at different moments, BW_LTE is usually a floating value. When congestion occurs on the DSL link and the HA switching condition is met, to utilize the bandwidth of the LTE link to a greatest extent, it is expected that CIR_LTE may have the same value as BW_LTE. However, in practice, it is difficult to make CIR_LTE equal to BW_LTE. Therefore, CIR_LTE only needs to be less than a specified value of BW_LTE in this embodiment of the present disclosure, and certainly CIR_LTE may be made less than but infinitely approximate to BW_LTE.

As shown in FIG. 5, an initial value, such as 10 KB, is first assigned to CIR_LTE. If the following conditions are met: the RTT of the LTE link is less than the queuing buffer duration of the wireless device and Delay(LTE)−Delay (DSL)<HG sequencing buffer duration, and a yellow packet exists in the second stage of CAR, CIR_LTE is raised. If all the foregoing conditions can be met after CIR_LTE is raised, this CIR_LTE raising phase may be referred to as a max probing phase in this embodiment. In this phase, values may be assigned to CIR_LTE in a geometric growth manner, such as 10, 20, 40, 80, 160, 320, 640, 1280, 2560, 5120, 10240, . . . , with the purpose of fast probing a location of the actual LTE bandwidth (BW_LTE). This phase provides a fast probing process for a later fast convergence phase.

After a value is assigned to CIR_LTE, and when the foregoing conditions cannot be met for the first time, the HAG enters the fast convergence phase. In the fast convergence phase, a dichotomy may be used to approximate to a location at which CIR_LTE decreases last time, and stay near the location for a relatively long time, so as to converge to a relatively stable network state. That is:

$$CIR\_LTE(n+1)=\tfrac{1}{2}(CIR\_LTE_{max}(n)+CIR\_LTE_{min}(n)).$$

where CIR_LTE(n+1) represents a value of CIR_LTE in an $(n+1)^{th}$ adjustment period, n is a positive integer, $CIR\_LTE_{max}(n)$ represents a maximum value of CIR_LTE in an $n^{th}$ adjustment period, and $CIR\_LTE_{min}(n)$ represents a minimum value of CIR_LTE in the $n^{th}$ adjustment period. In addition, $CIR\_LTE_{max}(n+1)=CIR\_LTE_{max}(n)$, and $CIR\_LTE_{min}(n+1)=CIR\_LTE(n+1)$.

CIR_LTE (n+1) can be finally converged using a dichotomy, that is, a value of CIR_LTE (n+1) is unchanged.

In addition, if one of the conditions: Delay(LTE)−Delay (DSL)<HG sequencing buffer time and RTT_LTE<Network device queuing buffer duration is not met, CIR_LTE is to be lowered by beta. A value of beta may be a fixed value of 10% in this embodiment. It should be noted that duration of one adjustment period in FIG. 5 in this embodiment of the present disclosure may be set according to a need.

Delay(LTE)−Delay(DSL) may be measured in the following manner:

The HAG may periodically send a measurement packet to the HG, or may record a timestamp in a GRE header portion in a data packet, so as to measure a one-way delay difference. Timestamps recorded when the HAG sends packets on the DSL link and LTE link are TS_SEND_DSL and TS_SEND_LTE respectively. Timestamps when the HG receives the packets are TS_RECV_DSL and TS_RECV_LTE respectively. Then, the one-way delay difference is: TS_Diff=(TS_RECV_LTE TS_RECV_DSL)−(TS_SEND_LTE−TS_SEND_DSL), and TS_Diff is a value of Delay(LTE)−Delay(DSL).

Figure 6:
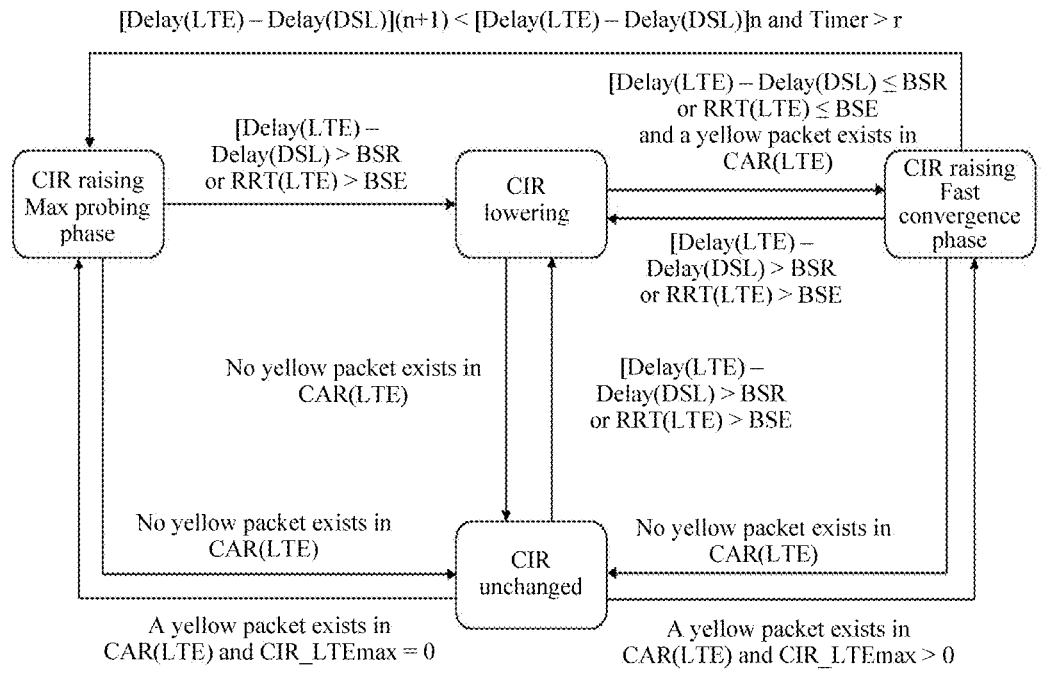
FIG. 6 is a schematic diagram of CIR adjustment according to an embodiment of the present disclosure.

FIG. 6 is a schematic diagram of CIR_LTE adjustment according to an embodiment of the present disclosure, as shown in FIG. 6.

With reference to FIG. 5 and FIG. 6, in this embodiment provided in the present disclosure, when [Delay(LTE)−Delay(DSL)](n+1)<[Delay(LTE)−Delay(DSL)]n, and timing Timer>r, CIR_LTE enters the max probing phase from the fast convergence phase. Timer is timing duration and r is an integer. In addition, when a yellow packet exists in CAR(LTE), and $CIR\_LTE_{max}(n)=0$, CIR_LTE enters the max probing phase from a CIR maintenance phase.

In this embodiment provided in the present disclosure, if Delay(LTE)−Delay(DSL)>BSR (i.e. sequencing buffer time), or RTT(LTE) of the LTE link>BSE (i.e. queuing buffer duration), CIR_LTE enters a CIR lowering phase from the max probing phase, the CIR maintenance phase, and the fast convergence phase, where BSE is a specified threshold.

In this embodiment provided in the present disclosure, if Delay(LTE)−Delay(DSL)≤BSR, RTT(LTE)≤BSE, and a yellow packet exists in CIR_LTE, CIR_LTE enters the fast convergence phase from the CIR lowering phase. In addition, if a yellow packet exists in CAR_LTE, CIR_LTE enters the fast convergence phase from the CIR maintenance phase.

In this embodiment provided in the present disclosure, if no yellow packet exists in CAR(LTE), CIR_LTE enters the CIR maintenance phase from the max probing phase and the fast convergence phase.

Figure 7A:
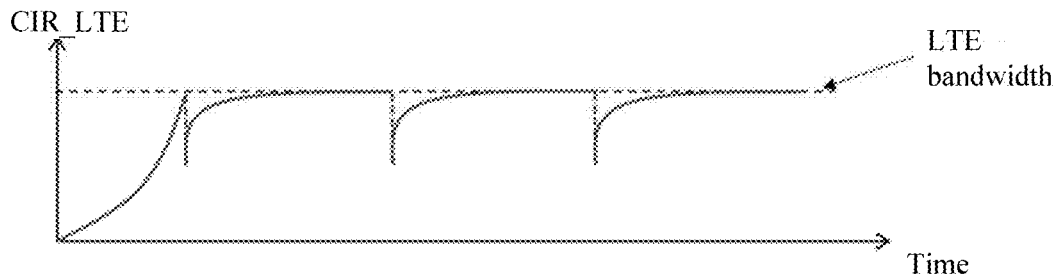
FIG. 7A is a schematic diagram of CIR_LTE adjustment when actual available bandwidth of LTE is unchanged according to an embodiment of the present disclosure.
Figure 7B:
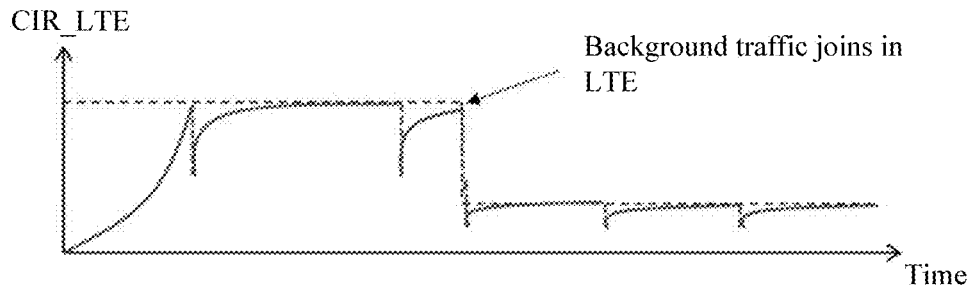
FIG. 7B is a schematic diagram of CIR_LTE adjustment when background traffic joins in an LTE link according to an embodiment of the present disclosure.
Figure 7C:
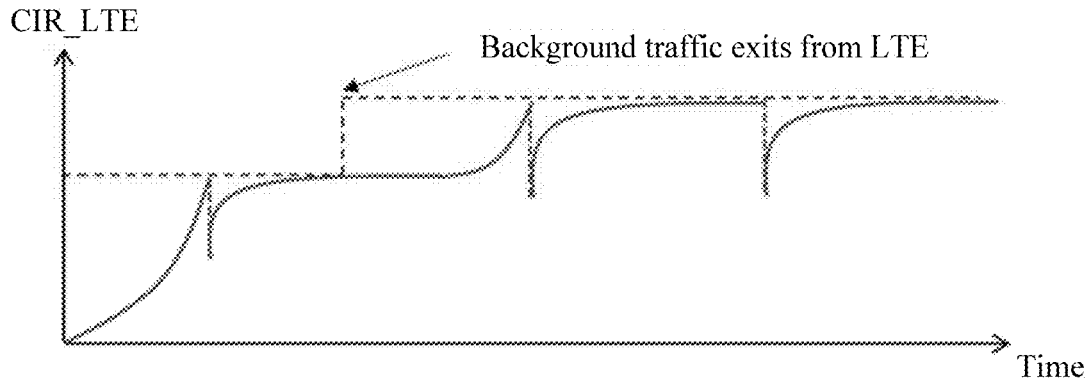
FIG. 7C is a schematic diagram of CIR_LTE adjustment when background traffic exits from an LTE link according to an embodiment of the present disclosure.

In another embodiment provided in the present disclosure, working states of CIR_LTE adjustment in different scenarios are shown in FIG. 7A to FIG. 7C. FIG. 7A is a schematic diagram of CIR_LTE adjustment when actual bandwidth of LTE does not change. After CIR_LTE enters a maintenance phase, to prevent congestion on an LTE link from causing a packet loss on the LTE link, and prevent bandwidth of the LTE link from being not fully utilized when available bandwidth on the LTE link increases, in this embodiment of the present disclosure, a timer is set after CIR_LTE enters the maintenance phase, and maximum bandwidth of the LTE link is re-probed after the timer expires. If available maximum bandwidth of the LTE link does not change, CIR_LTE re-enters the maintenance phase.

FIG. 7B is a schematic diagram of CIR_LTE adjustment when background traffic joins in the LTE link. FIG. 7C is a schematic diagram of CIR_LTE adjustment when background traffic exits from the LTE link. A background packet in this embodiment of the present disclosure means a packet transmitted by another user using the LTE. Because LTE is a user sharing mechanism, when more users use LTE, relatively large bandwidth of LTE may be occupied, and relatively small available bandwidth remains. Therefore, when more users use LTE, as shown in FIG. 7B, available maximum bandwidth in the LTE link decreases, and CIR_LTE also needs to decrease accordingly. When fewer users use LTE, LTE bandwidth occupied by other users may decrease, remaining available bandwidth increases, and CIR_LTE also needs to increase accordingly.

Therefore, CIR_LTE can be adjusted to an appropriate location in different conditions of the LTE link in this embodiment of the present disclosure.

The hybrid access tunnel bonding method provided in the present disclosure is to resolve a TCP performance degradation problem in an HA scenario that is caused by an increased delay and packet loss rate due to congestion of the LTE link. In this embodiment of the present disclosure, a difference between a one-way delay of the DSL link and a one-way delay of the LTE link is controlled, so that a packet loss caused by a sequencing buffer overflow is avoided. The RTT of the LTE link is controlled, so that problems such as an increased delay and a packet loss caused by congestion due to an excessively long queue do not occur on the LTE link. In an adaptive condition, packet allocation on the LTE link is controlled, so that packets allocated to the LTE link are optimal, and can well adapt to impact of background traffic joining or exiting.

Figure 8:
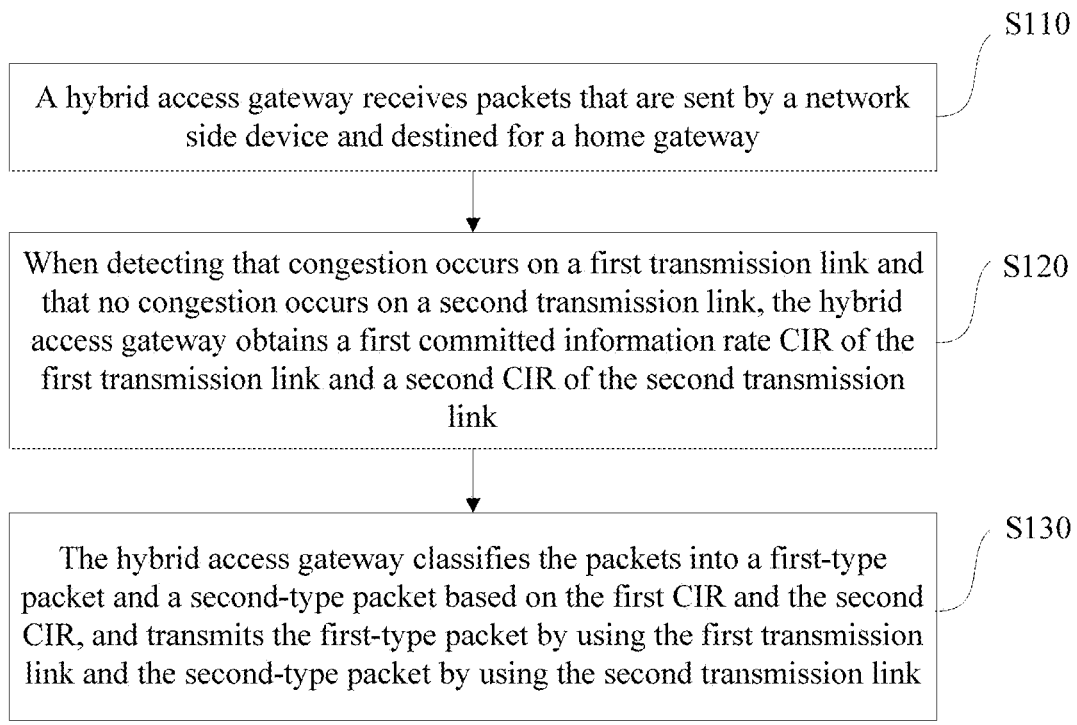
FIG. 8 is a flowchart of a packet transmission method according to an embodiment of the present disclosure.

To elaborate on an execution procedure on a HAG side in the foregoing embodiments, with reference to the foregoing embodiments, in another embodiment provided in the present disclosure, as shown in FIG. 8, a packet transmission method is provided, including the following steps.

In step S110, a hybrid access gateway receives packets that are sent by a network side device and destined for a home gateway.

The home gateway communicates with the hybrid access gateway using a first transmission link and a second transmission link separately.

In an initial state of network transmission, the HAG uses only a DSL link for data transmission, and completely disables an LTE link. In other words, in the initial state, the HAG uses only the DSL link to send and receive data, without using the LTE link for data transmission, including not using the LTE link for measurement packet transmission. The HAG obtains parameters such as a delay and a packet loss rate on the DSL link, to determine whether congestion occurs on the DSL link. For example, when the DSL link is used up, it can be determined, based on the obtained parameters such as the delay and the packet loss rate on the DSL link, that congestion occurs on the DSL link. When the HAG detects that congestion occurs on the DSL link, it indicates that an actual requirement cannot be met if the HAG uses only the DSL link for packet transmission. In this case, it needs to be considered to use hybrid access of the DSL link and the LTE link for packet transmission.

In step S120, when detecting that congestion occurs on the first transmission link and that no congestion occurs on the second transmission link, the hybrid access gateway obtains a first committed information rate CIR of the first transmission link and a second CIR of the second transmission link.

The first transmission link and the second transmission link are jointly connected to the hybrid access gateway, the first CIR is a first preset transmission rate of data transmission supported by the first transmission link, and the second CIR is a second preset transmission rate of data transmission supported by the second transmission link.

The first transmission link may be the DSL link, and the second transmission link may be the LTE link. For a manner of determining whether congestion occurs on the first transmission link and the second transmission link, refer to a manner of determining whether congestion occurs on the DSL link and the LTE link in the foregoing embodiments. The first CIR may be CIR(DSL) in the foregoing embodiments, and the second CIR is CIR(LTE) in the foregoing embodiments.

In step S130, the hybrid access gateway classifies the packets into a first-type packet and a second-type packet based on the first CIR and the second CIR, and transmits the first-type packet using the first transmission link and the second-type packet using the second transmission link.

In this embodiment of the present disclosure, the packet that is received by the HAG and bound for the HG is classified into two types, which are transmitted using the first transmission link and the second transmission link respectively. In addition, in this embodiment of the present disclosure, the HAG preferentially allocates a packet to the first transmission link, and re-allocates, to the first transmission link for transmission, a packet that cannot be transmitted using the second transmission link, so as to ensure that a rate of a packet allocated to the second transmission link does not exceed the second CIR.

For example, if the HAG receives m bits of packets in a unit time, the HAG determines, based on the first CIR, that a maximum of p bits of packets are allowed to pass through the first transmission link in the unit time.

The HAG determines, based on the second CIR, that a maximum of q bits of packets are allowed to pass through the second transmission link in the unit time.

The HAG first uses p bits in the packets as the first-type packet.

Further, if m−p≤q, the HAG uses m−p bits in the packets as the second-type packet; or if m−p>q, the HAG uses q bits in the packets as the second-type packet, and the m−p−q bits in the packets as the first-type packet.

After classifying the received packets destined for the HG into the first-type packet and the second-type packet, the HAG may transmit the first-type packet using the first transmission link and the second-type packet using the second transmission link. In this way, the packets received by the HAG are properly allocated and transmitted, and resources of the first transmission link and the second transmission link can be properly utilized, thereby improving packet transmission efficiency and reducing a packet loss rate.

In the packet transmission method provided in this embodiment of the present disclosure, the hybrid access gateway receives the packets that are sent by the network side device and destined for the home gateway; when detecting that congestion occurs on the first transmission link and that no congestion occurs on the second transmission link, the hybrid access gateway obtains the first CIR of the first transmission link and the second CIR of the second transmission link; and the hybrid access gateway classifies the packets into the first-type packet and the second-type packet, and transmits the first-type packet using the first transmission link and the second-type packet using the second transmission link. This can ensure that when congestion occurs on the first transmission link but no congestion occurs on the second transmission link, the first transmission link and the second transmission link are connected to the hybrid access gateway in a hybrid access manner. By properly allocating packets transmitted on the second transmission link, the hybrid access gateway can control one-way delays of the first transmission link and the second transmission link, thereby avoiding a packet loss caused by a sequencing buffer overflow, and greatly improving transmission efficiency of link transmission.

Figure 9:
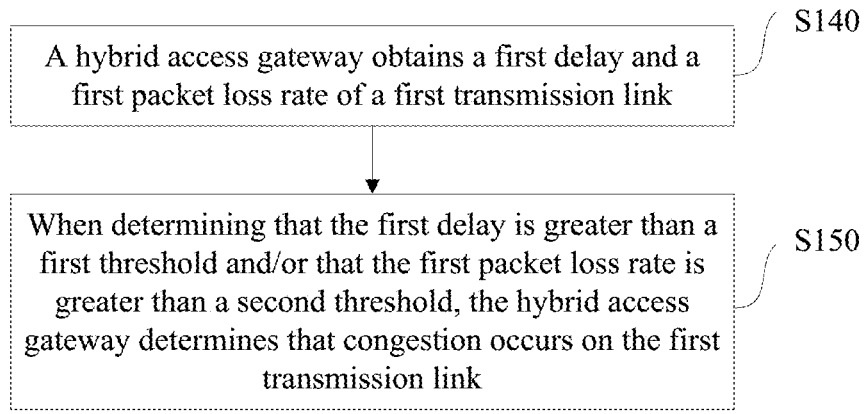
FIG. 9 is a flowchart of a packet transmission method according to another embodiment of the present disclosure.

To elaborate on how to determine whether congestion occurs on the first transmission link, as a further description of the method shown in FIG. 8, in another embodiment provided in the present disclosure, based on FIG. 8, as shown in FIG. 9, the method may further include the following steps.

In step S140, the hybrid access gateway obtains a first delay and a first packet loss rate of the first transmission link.

In step S150, when determining that the first delay is greater than a first threshold and/or that the first packet loss rate is greater than a second threshold, the hybrid access gateway determines that congestion occurs on the first transmission link.

Provided that the hybrid access gateway determines that at least one of conditions that the first delay is greater than the first threshold and that the first packet loss rate is greater than the second threshold is met, the hybrid access gateway can determine that congestion occurs on the first transmission link.

Figure 10:
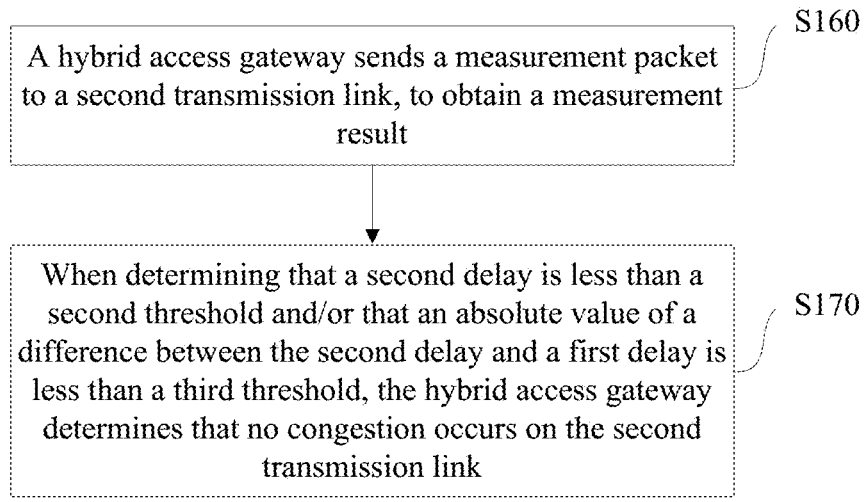
FIG. 10 is a flowchart of a packet transmission method according to still another embodiment of the present disclosure.

To elaborate on how to determine whether congestion occurs on the second transmission link, as a further description of the method shown in FIG. 8, in another embodiment provided in the present disclosure, based on FIG. 8, as shown in FIG. 10, the method may further include the following steps.

In step S160, the hybrid access gateway sends a measurement packet to the second transmission link, to obtain a measurement result.

The measurement result includes a second delay of the second transmission link.

In step S170, when determining that the second delay is less than the second threshold and/or that the absolute value of the difference between the second delay and the first delay is less than the third threshold, the hybrid access gateway determines that no congestion occurs on the second transmission link.

The hybrid access gateway obtains the measurement result of the measurement packet, and when determining that at least one of conditions that the second delay is less than the second threshold and that the absolute value of the difference between the second delay and the first delay is less than the third threshold is met, the hybrid access gateway can determine that no congestion occurs on the second transmission link.

Figure 11:
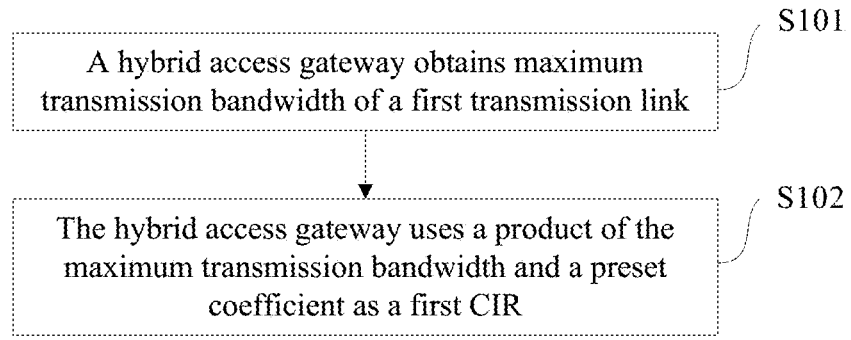
FIG. 11 is a flowchart of step S120 in FIG. 8.

To elaborate on how to obtain the first CIR of the first transmission link, as a further description of the method shown in FIG. 8, in another embodiment provided in the present disclosure, as shown in FIG. 11, step S120 may further include the following steps.

In step S101, the hybrid access gateway obtains maximum transmission bandwidth of the first transmission link.

In step S102, the hybrid access gateway uses a product of the maximum transmission bandwidth and a preset coefficient as the first CIR.

The first transmission link is equivalent to the DSL link in the foregoing implementation. The DSL link is exclusive to a user, and therefore the maximum transmission bandwidth of the DSL link is fixed and can be directly obtained. The preset coefficient may be 0.95 that is set in the foregoing embodiments.

Figure 12:
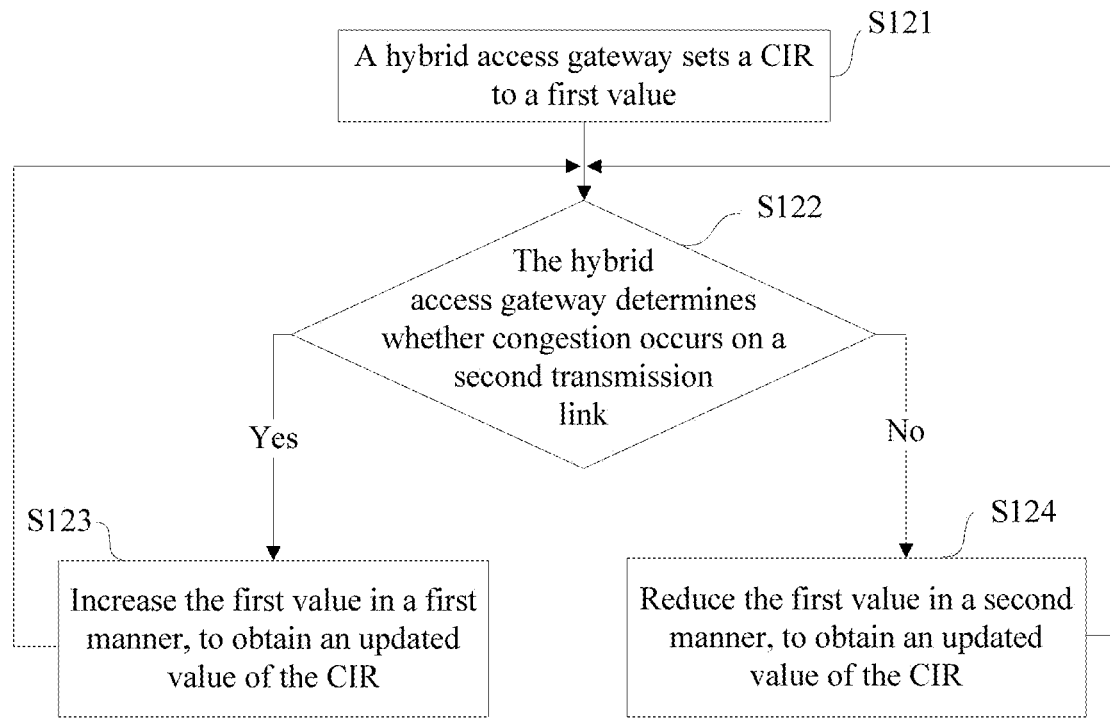
FIG. 12 is another flowchart of step S120 in FIG. 8.

To elaborate on how to obtain the second CIR of the second transmission link, as a further description of the method shown in FIG. 8, in another embodiment provided in the present disclosure, as shown in FIG. 12, step S120 may further include the following steps.

Step S121: The hybrid access gateway sets the CIR to a first value.

Step S122: The hybrid access gateway determines whether congestion occurs on the second transmission link; and performs step S123 when determining that no congestion occurs on the second transmission link, or performs step S124 when determining that congestion occurs on the second transmission link.

Step S123: Increase the first value in a first preset manner, to obtain an updated value of the CIR, and perform step S122 and step S123 based on the updated value, until the hybrid access gateway determines a target value when no congestion occurs on the second transmission link, and uses the target value as the CIR, where the target value is equal to maximum available transmission bandwidth of the second transmission link, or the target value is less than a maximum available transmission bandwidth preset value of the second transmission link.

Step S124: Reduce the first value in a second preset manner, to obtain an updated value of the CIR, and perform step S122 and step S123 based on the updated value, until the hybrid access gateway determines the target value when no congestion occurs on the second transmission link, and uses the target value as the CIR, where the target value is equal to maximum available transmission bandwidth of the second transmission link, or the target value is less than a maximum available transmission bandwidth preset value of the second transmission link.

For details, refer to FIG. 6 and the embodiment corresponding to FIG. 6 in the foregoing embodiments, and details are not described herein again.

In addition, when detecting that the absolute value of the difference between the second delay and the first delay is greater than the third threshold or the second delay is greater than the second threshold, the hybrid access gateway reduces the second CIR in the second preset manner.

Alternatively, when detecting that timing duration of a timer of the second CIR is greater than preset duration and that the second delay is less than the second threshold, the hybrid access gateway increases the second CIR in the first preset manner.

In this embodiment provided in the present disclosure, when detecting that a background packet is transmitted on the second transmission link, the hybrid access gateway reduces the second CIR in the second preset manner.

Alternatively, when detecting that background packets transmitted on the second transmission link are reduced, the hybrid access gateway increases the second CIR in the first preset manner.

A packet that does not enter the second transmission link through the hybrid access gateway is considered as the background packet.

With reference to the geometric growth manner in FIG. 5 and the embodiment corresponding to FIG. 5 in the foregoing embodiments, the first preset manner in this embodiment of the present disclosure may be the geometric growth manner when the hybrid access gateway enters a max probing state. When the hybrid access gateway enters a fast convergence state, the first preset manner and the second preset manner may be a dichotomy algorithm manner in the foregoing embodiments, and are used to make CIR_LTE approximate to actual bandwidth of the LTE link.

From the descriptions of the foregoing embodiments, a person skilled in the art may clearly understand that the present disclosure may be implemented by software in addition to necessary universal hardware platform or by hardware only. In most circumstances, the former is a preferred implementation. Based on such an understanding, the technical solutions of the present disclosure essentially, or the part contributing to the other approaches may be implemented in a form of a software product. The software product is stored in a storage medium, and includes several instructions for instructing a computer device (which may be a personal computer, a server, or a network device) to perform all or some of the steps of the methods described in the embodiments of the present disclosure. The storage medium includes any medium that can store program code, such as a read-only memory (ROM), a random access memory (RAM), a magnetic disk, or an optical disc.

Figure 13:
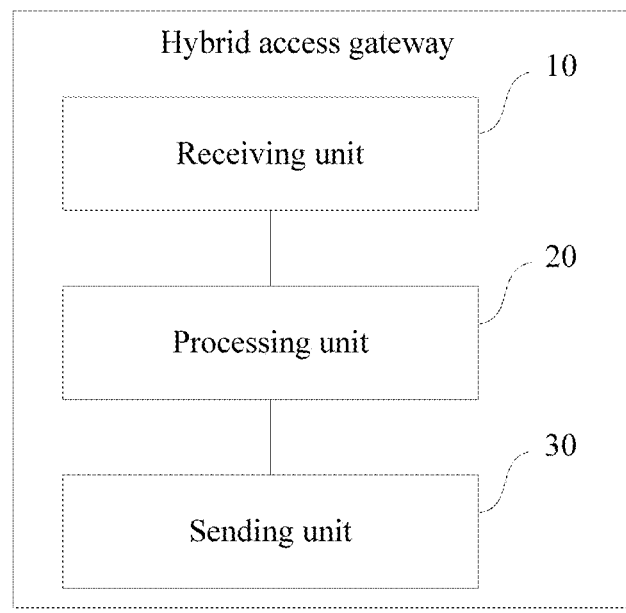
FIG. 13 is a schematic diagram of a hybrid access gateway according to an embodiment of the present disclosure.

In addition, as an implementation of the foregoing embodiments, an embodiment of the present disclosure further provides a hybrid access gateway, as shown in FIG. 13, including a receiving unit 10, a processing unit 20, and a sending unit 30.

The receiving unit 10 is configured to receive packets that are sent by a network side device and destined for a home gateway, where the home gateway communicates with the hybrid access gateway using a first transmission link and a second transmission link separately.

The processing unit 20 is configured to when detecting that congestion occurs on the first transmission link and that no congestion occurs on the second transmission link, obtain a first committed information rate CIR of the first transmission link and a second CIR of the second transmission link, where the first CIR is a first preset transmission rate of data transmission supported by the first transmission link, and the second CIR is a second preset transmission rate of data transmission supported by the second transmission link.

The processing unit 20 is further configured to classify the packets into a first-type packet and a second-type packet based on the first CIR and the second CIR, and transmit the first-type packet using the first transmission link and the second-type packet using the second transmission link.

In this embodiment provided in the present disclosure, m bits of packets are received by the hybrid access gateway in a unit time. The processing unit 20 is further configured to determine, based on the first CIR, that a maximum of p bits of packets are allowed to pass through the first transmission link in the unit time.

The processing unit 20 is further configured to determine, based on the second CIR, that a maximum of q bits of packets are allowed to pass through the second transmission link in the unit time.

The processing unit 20 is further configured to first use p bits in the packets as the first-type packet.

Further, if m−p≤q, the processing unit is further configured to use m−p bits in the packets as the second-type packet; or if m−p>q, the processing unit is further configured to use q bits in the packets as the second-type packet, and m−p−q bits in the packets as the first-type packet.

In this embodiment provided in the present disclosure, the processing unit is further configured to obtain a first delay and a first packet loss rate of the first transmission link.

The processing unit 20 is further configured to when determining that the first delay is greater than a first threshold and/or that the first packet loss rate is greater than a second threshold, determine that congestion occurs on the first transmission link.

In this embodiment provided in the present disclosure, the sending unit 30 is configured to send a measurement packet to the second transmission link, to obtain a measurement result, where the measurement result includes a second delay of the second transmission link.

The processing unit 20 is configured to when determining that the second delay is less than the second threshold and/or that an absolute value of a difference between the second delay and the first delay is less than a third threshold, determine that no congestion occurs on the second transmission link.

In this embodiment provided in the present disclosure, the processing unit 20 is further configured to obtain maximum transmission bandwidth of the first transmission link.

The processing unit 20 is further configured to use a product of the maximum transmission bandwidth and a preset coefficient as the first CIR.

In this embodiment provided in the present disclosure, the processing unit 20 is further configured to perform the following steps: A. setting the second CIR to a first value; B. determining whether congestion occurs on the second transmission link; and performing step C when determining that no congestion occurs on the second transmission link, or performing step D when determining that congestion occurs on the second transmission link; and C. increasing the first value in a first preset manner, to obtain an updated value of the second CIR, and performing the steps B and C based on the updated value, until the hybrid access gateway determines a target value when no congestion occurs on the second transmission link, and uses the target value as the second CIR, where the target value is equal to maximum available transmission bandwidth of the second transmission link, or the target value is less than a maximum available transmission bandwidth preset value of the second transmission link; or D. reducing the first value in a second preset manner, to obtain an updated value of the second CIR, and performing the steps B and D based on the updated value, until the hybrid access gateway determines a target value when no congestion occurs on the second transmission link, and uses the target value as the second CIR, where the target value is equal to maximum available transmission bandwidth of the second transmission link, or the target value is less than a maximum available transmission bandwidth preset value of the second transmission link.

In this embodiment provided in the present disclosure, the processing unit 20 is further configured to when detecting that the absolute value of the difference between the second delay and the first delay is greater than the third threshold or that the second delay is greater than the second threshold, reduce the second CIR in the second preset manner.

Alternatively, the processing unit 20 is further configured to when detecting that timing duration of a timer of the second CIR is greater than preset duration and that the second delay is less than the second threshold, increase the second CIR in the first preset manner.

In this embodiment provided in the present disclosure, the processing unit 20 is further configured to when detecting that a background packet is transmitted on the second transmission link, reduce the second CIR in the second preset manner.

Alternatively, the processing unit 20 is further configured to when detecting that background packets transmitted on the second transmission link are reduced, increase the second CIR in the first preset manner.

A packet that does not enter the second transmission link through the hybrid access gateway is considered as the background packet.

Specific manners of performing operations by the units and modules of the hybrid access gateway in the foregoing embodiment have been described in detail in the embodiments related to the method, and are not described in detail herein.

According to the hybrid access gateway provided in this embodiment of the present disclosure, the hybrid access gateway receives the packets that are sent by the network side device and destined for the home gateway; when detecting that congestion occurs on the first transmission link and that no congestion occurs on the second transmission link, the hybrid access gateway obtains the first CIR of the first transmission link and the second CIR of the second transmission link; and the hybrid access gateway classifies the packets into the first-type packet and the second-type packet, and transmits the first-type packet using the first transmission link and the second-type packet using the second transmission link. This can ensure that when congestion occurs on the first transmission link but no congestion occurs on the second transmission link, the first transmission link and the second transmission link are connected to the hybrid access gateway in a hybrid access manner. By properly allocating packets transmitted on the second transmission link, the hybrid access gateway can control one-way delays of the first transmission link and the second transmission link, thereby avoiding a packet loss caused by a sequencing buffer overflow, and greatly improving transmission efficiency of link transmission.

Figure 14:
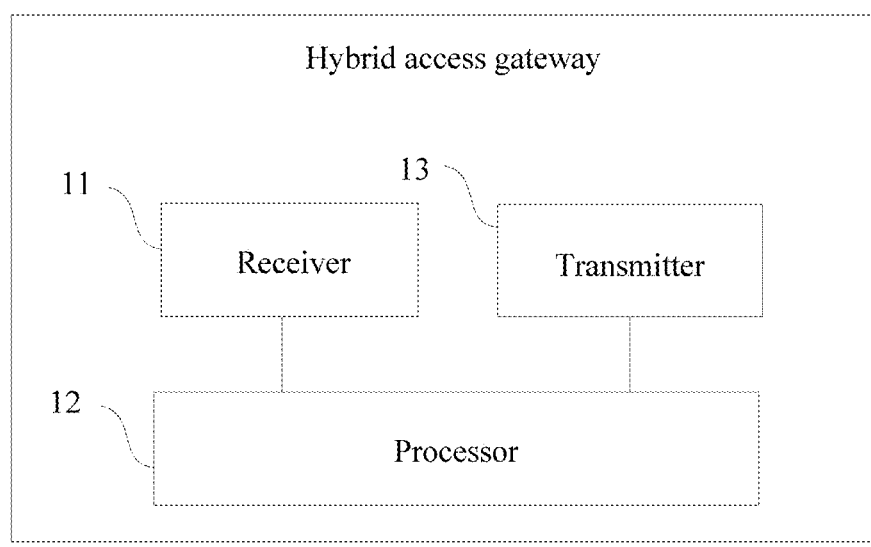
FIG. 14 is a schematic diagram of a hybrid access gateway according to another embodiment of the present disclosure.

In addition, in an optional embodiment, as shown in FIG. 14, the receiving unit 10 in FIG. 13 may be a receiver 11, the processing unit 20 may be a processor 12, and the sending unit 30 may be a transmitter 13. The receiver 11 or the transmitter 13 may be replaced with a transceiver. In addition, the hybrid access gateway may further include a memory (not shown in the figure). The memory is configured to store program code and data of the hybrid access gateway.

It can be understood that the present disclosure may be used in numerous general or dedicated computing system environments or configurations, for example, a personal computer, a server computer, a handheld or portable device, a tablet device, a multiprocessor system, a microprocessor-based system, a set-top box, a programmable consumer digital device, a network PC, a small computer, a mainframe computer, and a distributed computing environment including any one of the foregoing systems or devices.

The present disclosure can be described in the general context of computer executable instructions executed by a computer, for example, a program module. Generally, the program module includes a routine, a program, an object, a component, a data structure, and the like for performing a particular task or implementing a particular abstract data type. The present disclosure may also be practiced in distributed computing environments in which tasks are performed by remote processing devices that are connected using a communications network. In the distributed computing environments, program modules may be located in both local and remote computer storage media including storage devices.

It should be noted that in the specification, relational terms such as "first" and "second" are used only to differentiate an entity or operation from another entity or operation, and do not require or imply that any actual relationship or sequence exists between these entities or operations.

A person skilled in the art can easily figure out another implementation solution of the present disclosure after considering the specification and practicing the present disclosure that is disclosed herein. This application is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the embodiments are merely considered as examples, and the actual scope and the spirit of the present disclosure are pointed out by the following claims.

It should be understood that the present disclosure is not limited to the accurate structures that are described in the foregoing and that are shown in the accompanying drawings, and modifications and changes may be made without departing from the scope of the present disclosure. The scope of the present disclosure is limited only by the appended claims.

What is claimed is:

1. A packet transmission method, comprising:
   receiving, by a hybrid access gateway, packets that are from a network side device and are destined for a home gateway, wherein the home gateway communicates with the hybrid access gateway using a first transmission link and a second transmission link separately;
   obtaining, by the hybrid access gateway, a first committed information rate (CIR) of the first transmission link and a second CIR of the second transmission link, wherein the first CIR is a first preset transmission rate of data transmission supported by the first transmission link, and wherein the second CIR is a second preset transmission rate of data transmission supported by the second transmission link;
   classifying, by the hybrid access gateway, the packets into a first-type packet and a second-type packet based on the first CIR and the second CIR, wherein m bits of packets are received by the hybrid access gateway in a unit of time, and wherein classifying, by the hybrid access gateway, the packets into the first-type packet and the second-type packet based on the first CIR and the second CIR comprises:
      determining, by the hybrid access gateway based on the first CIR, that a maximum of p bits of the packets are allowed to pass through the first transmission link in the unit of time;
      determining, by the hybrid access gateway based on the second CIR, that a maximum of q bits of packets are allowed to pass through the second transmission link in the unit of time;
      using, by the hybrid access gateway, p bits in the packets as the first-type packet; and
      using, by the hybrid access gateway, m minus p bits in the packets as the second-type packet when m minus p is less than or equal to q; and transmitting the first-type packet using the first transmission link and the second-type packet using the second transmission link.

2. The packet transmission method of claim 1, further comprising:
obtaining, by the hybrid access gateway, a first delay and a first packet loss rate of the first transmission link; and
determining, by the hybrid access gateway, that congestion occurs on the first transmission link when the first delay is greater than a first threshold or the first packet loss rate is greater than a second threshold.

3. The packet transmission method of claim 2, further comprising:
sending, by the hybrid access gateway, a measurement packet to the second transmission link to obtain a measurement result, wherein the measurement result comprises a second delay of the second transmission link; and
determining, by the hybrid access gateway, that no congestion occurs on the second transmission link when an absolute value of a difference between the second delay and the first delay is less than a third threshold.

4. The packet transmission method of claim 1, wherein obtaining the first CIR of the first transmission link comprises:
obtaining, by the hybrid access gateway, a maximum transmission bandwidth of the first transmission link; and
using, by the hybrid access gateway, a product of the maximum transmission bandwidth and a preset coefficient as the first CIR.

5. The packet transmission method of claim 1, wherein obtaining the second CIR of the second transmission link comprises:
A. setting, by the hybrid access gateway, the second CIR to a first value;
B. determining, by the hybrid access gateway, whether congestion occurs on the second transmission link, and either performing step C when determining that no congestion occurs on the second transmission link, or performing step D when determining that congestion occurs on the second transmission link; and
C. increasing the first value in a first preset manner to obtain an updated value of the second CIR, returning to step B until the hybrid access gateway determines a target value when no congestion occurs on the second transmission link, and using link, and uses the target value as the second CIR, wherein the target value is equal to maximum available transmission bandwidth of the second transmission link; or
D. reducing the first value in a second preset manner to obtain an updated value of the second CIR, and returning to step B.

6. The packet transmission method of claim 5, further comprising reducing, by the hybrid access gateway, the second CIR in a second preset manner when detecting that an absolute value of a difference between a second delay and a first delay is greater than a third threshold or that the second delay is greater than a second threshold.

7. The packet transmission method of claim 5, further comprising increasing, by the hybrid access gateway, the second CIR in a first preset manner when detecting that timing duration of a timer of the second CIR is greater than preset duration and that a second delay is less than a second threshold.

8. The packet transmission method of claim 5, further comprising reducing, by the hybrid access gateway, the second CIR in a second preset manner when detecting that a background packet is transmitted on the second transmission link, wherein a packet that does not enter the second transmission link through the hybrid access gateway is the background packet.

9. The packet transmission method of claim 5, further comprising increasing, by the hybrid access gateway, the second CIR in a first preset manner when detecting that background packets transmitted on the second transmission link are reduced, wherein packets that do not enter the second transmission link through the hybrid access gateway are the background packets.

10. The packet transmission method of claim 1, wherein obtaining the first CIR of the first transmission link and the second CIR of the second transmission link is performed in response to detecting that congestion occurs on the first transmission link, detecting that no congestion occurs on the second transmission link, or detecting that congestion occurs on the first transmission link and that no congestion occurs on the second transmission link.

11. The packet transmission method of claim 1, wherein the first transmission link is a digital subscriber line (DSL) link, and wherein the second transmission link is a wireless network link.

12. The packet transmission method of claim 11, wherein the wireless network link is a Long-Term Evolution (LTE) link.

13. A hybrid access gateway, comprising:
a processor; and
a non-transitory computer readable medium coupled to the processor and containing computer-executable instructions, wherein the processor is configured to execute the computer-executable instructions to configure the hybrid access gateway to:
receive packets that are from a network side device and that are destined for a home gateway, wherein the hybrid access gateway communicates with the home gateway using a first transmission link and a second transmission link separately;
obtain a first committed information rate (CIR) of the first transmission link and a second CIR of the second transmission link, wherein the first CIR is a first preset transmission rate of data transmission supported by the first transmission link, and wherein the second CIR is a second preset transmission rate of data transmission supported by the second transmission link;
classify the packets into a first-type packet and a second-type packet based on the first CIR and the second CIR, wherein m bits of packets are received by the hybrid access gateway in a unit of time, and wherein classifying the packets into the first-type packet and the second-type packet based on the first CIR and the second CIR comprises:
determining, based on the first CIR, that a maximum of p bits of packets are allowed to pass through the first transmission link in the unit of time;
determining, based on the second CIR, that a maximum of q bits of packets are allowed to pass through the second transmission link in the unit of time;
first using p bits in the packets as the first-type packet;
using m minus p bits in the packets as the second-type packet when m minus p is less than or equal to q;

using q bits in the packets as the second-type packet and m minus p minus q bits in the packets as the first-type packet when m minus p is greater than q; and transmit the first-type packet using the first transmission link and the second-type packet using the second transmission link.

14. The hybrid access gateway of claim 13, wherein the processor is further configured to execute the computer-executable instructions to configure the hybrid access gateway to:

obtain a first delay and a first packet loss rate of the first transmission link; and determine that congestion occurs on the first transmission link when determining that the first delay is greater than a first threshold or that the first packet loss rate is greater than a second threshold.

15. The hybrid access gateway of claim 14, wherein the processor is further configured to execute the computer-executable instructions to configure the hybrid access gateway to:

send a measurement packet to the second transmission link to obtain a measurement result, wherein the measurement result comprises a second delay of the second transmission link; and determine that no congestion occurs on the second transmission link when determining that the second delay is less than the second threshold or that an absolute value of a difference between the second delay and the first delay is less than a third threshold.

16. The hybrid access gateway of claim 13, wherein obtaining the first CIR of the first transmission link comprises:

obtaining maximum transmission bandwidth of the first transmission link; and using a product of the maximum transmission bandwidth and a preset coefficient as the first CIR.

17. The hybrid access gateway of claim 13, wherein obtaining the second CIR of the second transmission link comprises:

A. setting the second CIR to a first value;
B. determining whether congestion occurs on the second transmission link, and either performing step C when determining that no congestion occurs on the second transmission link, or performing step D when determining that congestion occurs on the second transmission link; and
C. increasing the first value in a first preset manner to obtain an updated value of the second CIR, returning to step B until the processor determines a target value when no congestion occurs on the second transmission link, and using the target value as the second CIR, wherein the target value is equal to maximum available transmission bandwidth of the second transmission link; or
D. reducing the first value in a second preset manner to obtain an updated value of the second CIR, and returning to step B.

18. The hybrid access gateway of claim 17, wherein the processor is further configured to execute the computer-executable instructions to configure the hybrid access gateway to reduce the second CIR in a second preset manner when detecting that an absolute value of a difference between a second delay and a first delay is greater than a third threshold or that the second delay is greater than a second threshold.

19. The hybrid access gateway of claim 17, wherein the processor is further configured to execute the computer-executable instructions to configure the hybrid access gateway to increase the second CIR in a first preset manner when detecting that a timing duration of a timer of the second CIR is greater than preset duration and that a second delay is less than a second threshold.

20. The hybrid access gateway of claim 17, wherein the processor is further configured to execute the computer-executable instructions to configure the hybrid access gateway to reduce the second CIR in a second preset manner when detecting that a background packet is transmitted on the second transmission link, and wherein a packet that does not enter the second transmission link through the hybrid access gateway is the background packet.

21. A non-transitory computer readable medium which contains computer-executable instructions, wherein the computer-executable instructions, when executed by a processor, configure a hybrid access gateway to:

receive packets that are from a network side device and that are destined for a home gateway, wherein the hybrid access gateway communicates with the home gateway using a first transmission link and a second transmission link separately;

obtain a first committed information rate (CIR) of the first transmission link and a second CIR of the second transmission link, wherein the first CIR is a first preset transmission rate of data transmission supported by the first transmission link, and wherein the second CIR is a second preset transmission rate of data transmission supported by the second transmission link;

classify the packets into a first-type packet and a second-type packet based on the first CIR and the second CIR, wherein m bits of packets are received by the hybrid access gateway in a unit of time, and wherein classifying the packets into the first-type packet and the second-type packet based on the first CIR and the second CIR comprises:

determining, based on the first CIR, that a maximum of p bits of packets are allowed to pass through the first transmission link in the unit of time;

determining, based on the second CIR, that a maximum of q bits of packets are allowed to pass through the second transmission link in the unit of time;

first using p bits in the packets as the first-type packet;

using m minus p bits in the packets as the second-type packet when m minus p is less than or equal to q; and using q bits in the packets as the second-type packet and m minus p minus q bits in the packets as the first-type packet when m minus p is greater than q; and transmit the first-type packet using the first transmission link and the second-type packet using the second transmission link.

22. A packet transmission method, comprising:

receiving, by a hybrid access gateway, packets that are from a network side device and are destined for a home gateway, wherein the home gateway communicates with the hybrid access gateway using a first transmission link and a second transmission link separately;

obtaining, by the hybrid access gateway, a first committed information rate (CIR) of the first transmission link and a second CIR of the second transmission link, wherein the first CIR is a first preset transmission rate of data transmission supported by the first transmission link, and wherein the second CIR is a second preset transmission rate of data transmission supported by the second transmission link;

classifying, by the hybrid access gateway, the packets into a first-type packet and a second-type packet based on the first CIR and the second CIR, wherein m bits of packets are received by the hybrid access gateway in a unit of time, and wherein classifying, by the hybrid access gateway, the packets into the first-type packet and the second-type packet based on the first CIR and the second CIR comprises:

determining, by the hybrid access gateway based on the first CIR, that a maximum of p bits of the packets are allowed to pass through the first transmission link in the unit of time;

determining, by the hybrid access gateway based on the second CIR, that a maximum of q bits of packets are allowed to pass through the second transmission link in the unit of time;

using, by the hybrid access gateway, p bits in the packets as the first-type packet; and using, by the hybrid access gateway, q bits in the packets as the second-type packet and m minus p minus q bits in the packets as the first-type packet; and transmitting the first-type packet using the first transmission link and the second-type packet using the second transmission link.

\* \* \* \* \*

UNITED STATES PATENT AND TRADEMARK OFFICE
CERTIFICATE OF CORRECTION

PATENT NO. : 11,025,531 B2  
APPLICATION NO. : 16/447607  
DATED : June 1, 2021  
INVENTOR(S) : Jian Cheng et al.

Page 1 of 1

It is certified that error appears in the above-identified patent and that said Letters Patent is hereby corrected as shown below:

In the Claims

Claim 5, Column 19, Line 47: "link, and using link, and uses the target" should read "link, and using the target"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*